United States Patent [19]

Hendrickson

[11] Patent Number: 5,380,052
[45] Date of Patent: Jan. 10, 1995

[54] RELEASABLE HANDLE-TYPE FASTENER FOR PIPE COUPLINGS

[75] Inventor: Thomas R. Hendrickson, Pelkie, Mich.

[73] Assignee: Quikcoup, Inc., Houghton, Mich.

[21] Appl. No.: 172,720

[22] Filed: Dec. 27, 1993

[51] Int. Cl.⁶ ............................................. F16L 23/08
[52] U.S. Cl. ..................... 285/364; 285/365; 285/406; 285/409; 24/270; 24/273
[58] Field of Search .............. 285/364, 365, 406, 407, 285/409, 311, 112; 24/270, 273; 292/256.69, 256.65, 257

[56] References Cited

U.S. PATENT DOCUMENTS

| 2,536,602 | 1/1951 | Guett | 285/364 X |
| 4,573,717 | 3/1986 | Peacock | 285/365 |
| 4,649,614 | 3/1987 | Lund | 285/406 X |

FOREIGN PATENT DOCUMENTS

| 0534453 | 12/1956 | Canada | 285/407 |
| 0540116 | 12/1931 | Germany | 285/364 |
| 2218350 | 11/1989 | United Kingdom | 285/364 |

Primary Examiner—Randolph A. Reese
Assistant Examiner—Heather Chun Shackelford
Attorney, Agent, or Firm—Harness, Dickey & Pierce

[57] ABSTRACT

A manually releasable, toggle-type fastener is provided for use, in place of the conventional bolt-and-nut fastener that is normally used to secure together the adjacent, aligned, bolt lugs formed on the ends of curved segments which form a circular pipe coupling. The fastener includes a first pin part fitted into the bolt hole of a first lug, and a second pin part fitted into the bolt hole of the second lug. A lever is pivotally connected to the first pin part for swinging into a locked position adjacent its segment and for swinging into an unlocked position away from its segment. The lever has an end to which a clamp member is releasibly secured. The clamp extends along the lugs and has an end which engages the second lug and which carries the second pin part for securing the lugs together. The fastener may be made in different sizes to fit different size bolt lugs on different size couplings. Particularly, the clamp member may be exchanged for different size clamp members for utilizing the same fastener for fastening different size coupling lugs.

6 Claims, 2 Drawing Sheets

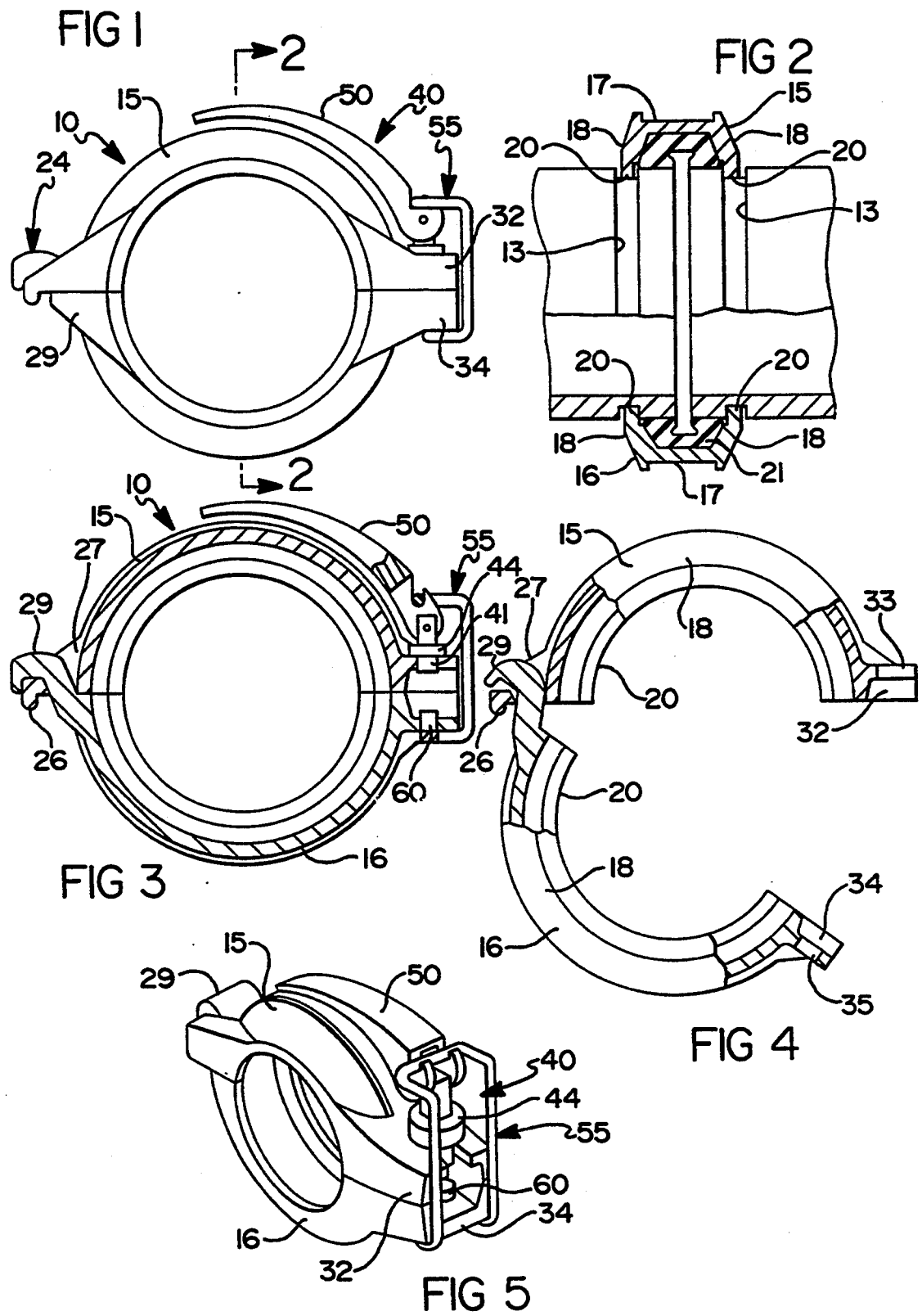

RELEASABLE HANDLE-TYPE FASTENER FOR PIPE COUPLINGS

BACKGROUND OF INVENTION

This invention relates to a manually releasable fastener which may be substituted for conventional bolt and nut fasteners that are used for securing together the adjacent ends of conventional segment type pipe couplings.

One conventional type of pipe coupling comprises two or more curved segments which are assembled together, end-to-end, to encircle and couple the adjacent ends of a pair of axially aligned pipes. Typically, such couplings are provided with integral, radially outwardly extending lugs on the ends of the curved segments. These lugs are provided with bolt holes through which bolts are extended and fastened by nuts for securing the segments together to form the circular or ring-like coupling. In such couplings, both ends of each segment are formed with bolt receiving lugs. Adjacent lugs are secured together with conventional bolts and nuts. Alternatively, some of such couplings have segments which are provided with hinge components for hingedly connecting one segment to the adjacent end of the opposite segment. Then bolts and nuts are used to fasten the adjacent lugs that are formed on the opposite ends of segments. Examples of such couplings are described and illustrated in U.S. Pat. No. 4,915,418 issued to Josef Palatchy on Apr. 10, 1990 for a "Hinged Pipe Coupling," and in U.S. Pat. No. 4,966,395 issued to Thomas R. Hendrickson on Oct. 30, 1990 for a "Rigid or Flexible Coupling for Pipes," and in U.S. Pat. No. 5,018,768 issued to Josef Palatchy on May 28, 1992 for a "Pipe Coupling Hinge."

In such pipe couplings the curved segments are generally U-shaped in cross-section to provide side walls or legs that extend radially inwardly from a base. The inner free edges of the legs form keys or tenons which fit into circumferential grooves that are cut in the pipes, near the ends of the pipes. A rubber-like gasket is arranged within the space or channel formed by the U-shaped cross-section coupling segments. The gasket encircles and seals the adjacent ends of the pipes when the keys are placed within the pipe grooves.

Such couplings are typically used for water lines or for pipe lines for conducting other fluids or gases. By way of example, water lines may be formed of a large number of pipes that are coupled end-to-end. Each pipe is provided with circumferential grooves located near its opposite ends and the pairs of adjacent pipe ends are arranged close to each other. The coupling is then positioned around a pair of adjacent pipe ends and is secured in place to form a coupled joint.

Whether the segments are fastened together at one end by a hinge arrangement and at the opposite end by bolt-and-nut fasteners or, whether the segments are fastened together entirely by bolt-and-nut fasteners, the segments must be manually positioned around the pipe ends. Then considerable time is involved in manipulating and fastening the one or two bolt-and-nut fasteners. Although the time is minimal to fasten a single bolt-and-nut fastener, where numerous couplings are used, as for example, in a water line in a building, the aggregate time expended by the plumbing installer to fasten the bolts-and-nuts becomes considerable. Hence, it is desirable to have a coupling system in which the segments of the couplings can be manually assembled rapidly, without the need for wrenches or other tools. To meet that need, prior, commercially available, couplings have been made with toggle or lever types of fasteners for interlocking adjacent ends of coupling segments. Examples of such devices are shown in U.S. Pat. No. 4,123,095 issued to Theodore A. Stehlin on Oct. 31, 1978 for a "Pipe Clamp Having An Overcenter Toggle," and in U.S. Pat. No. 4,561,678 issued to Donald R. Kunsman on Dec. 31, 1985 for a "Pipe Coupling," and in Swiss Patent No. 390,637 granted to Societe de Constructions d'Appareils Mecaniques Inoxydables on Apr. 15, 1965.

Segmented pipe couplings that use bolt fasteners are relatively inexpensive to manufacture. In contrast, pipe couplings that use toggle fasteners, particularly where made with sufficient strength and rigidity for coupling relatively large pipes, are considerably more expensive to produce. Thus, it would be desirable to have available, for example, on a plumbing contracting job site, relatively inexpensive bolt-type fastened couplings with toggle-type fasteners, but without the additional expense of a conventional toggle-type coupling.

The invention herein relates to a fastener, similar to a toggle-type locking fastener, which may be manufactured and stored as an independent unit, and which may be substituted, whenever desired, for the typical bolt-and-nut fastener that is used in a conventional bolt-type coupling, so as to provide the low cost benefit of a bolt-type coupling with the high speed, manual assembly ability of a toggle-type coupling.

SUMMARY OF INVENTION

This invention contemplates a releasable fastener which has an upper pin member of a size and shape to be inserted in the bolt hole formed in the upper lug of the aligned, upper and lower, fastener lugs formed on the ends of conventional pipe coupling segments. The pin, which replaces the conventional bolt, is provided with a head that engages the upper exterior surface of the upper lug through which the pin is inserted. The pin head is provided with an extension which is fastened, by a pivotal connection, to the end of a toggle-type lever or handle. The lever has a hook-like forward portion which receives and is engaged with an upper end of an elongated, clamp member which extends along the lugs. The opposite or lower end of the clamp member is arranged beneath the lower surface of the lower bolt lug when the toggle lever is swung into locking position. The lower end of the clamp member carries a lower pin portion which is fitted within the bolt hole of the lower lug and is axially aligned with the upper pin member. The aligned upper and lower pin members and the clamp member fasten the bolt lugs together. Conversely, when the lever is swung into its unlock position, the lower pin member drops out of the bolt hole in the lower lug and the clamp member releases, so that the fastener may be manually removed from the coupling.

The fastener construction is simple and is inexpensive to produce. It is formed as a separate unit which can be carried by plumbing contractors for use, when desired, in place of the conventional bolt-and-nut fasteners which otherwise could have been used with couplings of the type described. Thus, it is contemplated to form such fasteners and, particularly, their clamping members, in several different sizes, each size of which can accommodate a number of different size couplings so that the number of fasteners may be limited. For example, three different fastener sizes could be made to accommodate nine different size couplings. Thus, the plumbing installer has the option of either using the removable handle fastener of this invention when desired, particularly, in places where it is desirable to provide a quick connection and disconnection, without tools, or to use conventional (and less expensive) bolt-and-nut fasteners. An example of this use would occur where a water line is arranged in an agricultural environment for delivering water from one place in a field to another, where the line must be disassembled and reassembled in another location. Although the releasible fasteners are much more expensive than bolts and nuts, the speed of application and removal without tools is so much greater that such a water line can be laid in place temporarily and removed and replaced elsewhere so quickly that the additional expense of the fastener is made up by the substantial reduction in labor costs associated with assembly and disassembly of the water line.

A similar utility for the fastener herein could be in mines where water pipes or pipes carrying other liquids or gases must be installed and then removed and replaced periodically. Again, the increase in expense for the fasteners, which are used in place of the less expensive bolt-and-nut fasteners, is off-set by the substantial reduction in labor. Other environments and uses of the fastener herein will be apparent to those involved in installing and removing pipe lines of various kinds.

One object of this invention is to provide a fastener which can be readily used in place of the bolt-and-nut fasteners that are normally used with segment type couplings. The construction of the improved fastener herein is such that it is relatively inexpensive, relatively lightweight and small in size so that it can be easily carried by contractors and made available at job sites. Further, it can be readily applied and removed manually without the use of any tools.

Another object of this invention is to provide a fastener which can be used with typical conventional couplings of various sizes whenever an installer chooses to use such a fastener in place of the commonly used bolt-and-nut fasteners. This arrangement would substantially reduce the cost of using a conventional toggle-type coupling since the costs of the present fastener plus the cost of a conventional bolt-type coupling would normally be less than the cost of a typical toggle-type coupling.

These and other objects and advantages of this invention will become apparent upon reading the following description, of which the attached drawings form a part. Referring now to the drawings:

DESCRIPTION OF DRAWING

FIG. 1 is an elevational view of a pipe coupling comprising a pair of curved segments which are connected together by a hinge connection at one end and by the removable fastener securing together the segment bolt lugs at the opposite ends of the segments;

FIG. 2 is a cross-sectional view taken as if in the direction of arrows 2—2 of the coupling to illustrate schematically the engagement between the coupling keys or tenons within the grooves formed in the ends of the pipes;

FIG. 3 is a cross-sectional, elevational view of the coupling illustrated in FIG. 1 and illustrates the positioning of the fastener in the bolt lugs;

FIG. 4 is a view, partially in cross-section showing the segments, with the fastener removed, swung apart about their adjacent hinge elements, for engagement or disengagement from the pipe ends;

FIG. 5 is a perspective view showing the bolt lugs of a coupling fastened together by the fastener of this invention;

DETAIL DESCRIPTION

Figure 6:
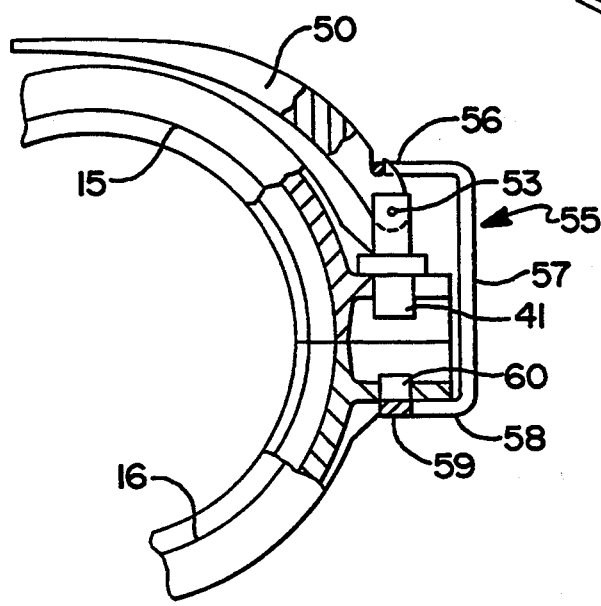
FIG. 6 is an enlarged, fragmentary view, partially in cross-section showing the fastener in operative or fastened position within the bolt lugs of a coupling.

Referring to the drawings, FIG. 1 illustrates a hinged segment-type pipe coupling 10 which is used to couple the adjacent ends of aligned pipes 11 and 12 as shown in FIG. 2. The pipes are provided with circumferential grooves 13 near their ends.

The pipe coupling is formed, in this illustration, of an upper, semi-circular curved segment 15 and a lower, semi-circular curved segment 16 which are arranged in an end-to-end alignment to form a circular coupling that surrounds the pipe ends. The terms "upper" and "lower" are used for ease in explanation of the parts illustrated. Obviously, the segments can be reversed or arranged vertically. Therefore, such terms should not be considered as limitations on the relative locations of the segments or on the number of segments that are used for a particular coupling.

Each of the segments are U-shaped in cross-section to provide an exterior base 17 with radially inwardly directed sidewalls 18. The free inner edges of the sidewalls form keys or tenons which fit into the grooves 13 in the pipes. (See FIG. 2.) A rubber-like gasket 21 is arranged within the space provided within the U-shaped configuration of the segments. The gasket surrounds the pipes and is sealed to the surfaces of the pipes. Such gaskets are conventional and come in various shapes and sizes.

The adjacent pairs of ends of the aligned coupling segments may be fastened together by bolts and nuts as is conventional or, in another form of such couplings, may have one pair of adjacent ends fastened together by means of a hinge formation and the opposite adjacent ends fastened together by a bolt and nut. The coupling illustrated in the drawings is provided with such a hinge-fastening arrangement on one pair of adjacent segment ends. Thus, the segments 15 and 16 may be provided with a hinge connection 24 which comprises a U-shaped lug 25 formed integrally on the upper segment 15. The lug provides an axle 26 arranged transversely of the coupling base, that is, parallel to the axis of the coupling. The axle is integral with spaced apart sidewalls 27 which, in turn, are integral with the segment body. The lower segment 16 is formed with an integral hook-shaped lug 29 which fits into the space between the axle 26 and the sidewalls 27 and engages around the axle for hinging operation. This is illustrated in FIGS. 3 and 4. The particular shape and arrangement of the hinge connection is not material to the invention of this application.

Normally, the coupling illustrated in the drawings would be arranged with its segments pivoted or hinged apart, as shown in FIG. 4, to fit around a pair of aligned pipe ends. The pipe installer typically would align the pipe ends and arrange the gasket 21 around the adjacent ends. Then, he would swing the two segments towards each other about the hinge 24, to form the circular coupling which surrounds the pipe ends. Simultaneously, this positions the keys or tenons of the segments within the pipe grooves 13. Next, a bolt and nut would normally be used to fasten the opposite ends of the segments together.

In order to fasten the segment ends together, the upper segment 15 is provided with an integral, radially outwardly extending bolt lug 32 which, for example, may be U-shaped in cross-section. The base of the U-shaped lug is provided with a generally radially extending slot 33 for receiving a bolt. The lower curved segment 16 is provided with an integral, U-shaped in cross-section, bolt lug 34 which may be provided with a bolt hole 35 through which the bolt may extend. The foregoing arrangement is conventional.

Figure 8:
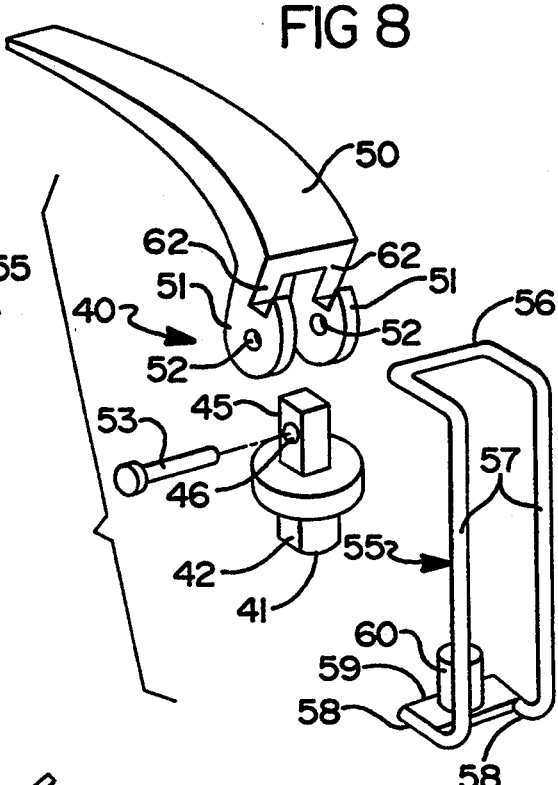
FIG. 8 is a perspective view of the fastener, showing the fastener parts disassembled from each other.
Figure 7:
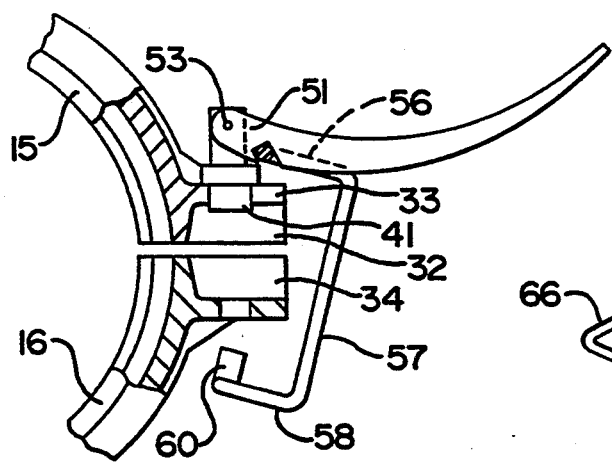
FIG. 7 illustrates the lever or toggle handle of the fastener swung into its release position which releases the fastener from the lower bolt lug.

Rather than utilizing a conventional bolt extending through the slot 33 and bolt hole 35 in the bolt lugs 32 and 34, the piping installer may use the fastener, generally designated as 40. The construction of the fastener is illustrated in FIGS. 6, 7 and 8.

The fastener comprises an upper pin member 41 which is approximately of the same diameter as a typical bolt which would have otherwise been used with the illustrated coupling. Preferably the sides of the pin are provided with flat surfaces 42 for snug engagement against the walls defining the slot 33 in the upper bolt lug.

The pin member 41 is provided with a head 44 of suitable size and shape to engage against the exposed, upper surface of the upper lug 32. In addition, the head has an integral head extension 45 which extends upperwardly from the head. A hole 46, to receive a pivot pin, is formed in the head extension.

The fastener includes a toggle-type handle or lever 50. A pair of hook-like end portions 51 are formed on the lever and are spaced apart a sufficient distance to receive the pin head extension 45 between them. Pivot pin holes 52 are formed in the end portions 51 for receiving a pivot pin 53 which pivotally connects the lever to the head extension.

A rigid, wire-like loop 55 (see FIG. 8), which is roughly rectangular in shape, is provided with a horizontally bent, upper portion 56 that is engaged with the lever. The loop has side parts 57, which extend downwardly along the aligned lugs, and terminate in lower bent parts 58. The bent parts 58 are connected together by a rigid strip 59 which may be welded to the bent parts or formed integral with them. The strip engages the lower surface of the lower lug 34. A lower pin member 60 is rigidly secured to the strip 59 so that it may extend upwardly into the bolt hole 35 in the lower lug 34 in axial alignment with the upper pin member 41. The upper portion 56 of the loop fits tightly into hook-forming slots 62 in the hook end portions 51 of the lever, as illustrated in FIG. 6.

In operation, when the piping installer decides to use the fastener 40, in place of the usual bolt and nut, he follows the same procedure for applying the coupling around the pipe ends as he would have used for the bolt and nut fastener. However, to fasten the adjacent bolt lugs together, the installer positions the pin 41 within the slot 33 of the upper bolt lug 32 (see FIG. 7). The lever handle would be in the position generally shown in FIG. 8 with the loop 55 dangling downwardly. Next, the loop is swung around the lower lug so that it enters the bolt hole 35 in the lower lug as the lever is swung manually into the locking position shown, for example, in FIG. 6. This pulls the loop lower strip into tight engagement with the lower lug for locking the bolt lugs together.

Figure 9:
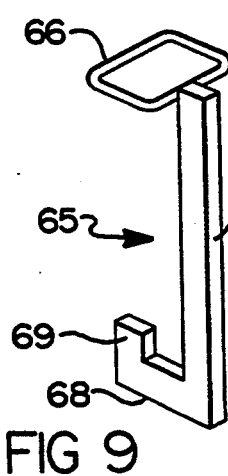
FIG. 9 is a perspective view of a modified clamping member.

FIG. 9 shows a modified clamping member 65 which has a wire loop upper portion 66 for engaging within the hook slots 62 of the lever hook portions 51. A side part or stem 67, secured to the loop 66, as by welding, extends downwardly and terminates in a horizontal part 68 which has an upwardly extending pin portion 69. This clamping member could be made of a single cast metal piece or fabricated of stiff wire and metal strips, as illustrated.

Figure 10:
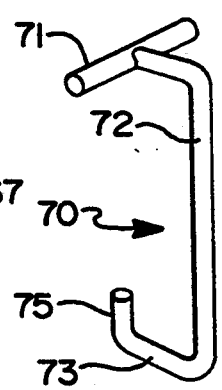
FIG. 10 is a perspective view of a second modified clamping member.

FIG. 10 illustrates a second modified clamping member 70 having an upper cross piece 71 for engagement with the lever hook portions 55. A downwardly extending side part or stem 72 is connected to the cross-piece and has a lower part 73 with an upwardly bent, lower pin member 75. This unit may be cast as an integrated unit or fabricated out of wire and metal strips.

The shapes and sizes of the lugs may be varied. For example, the lugs may be solid rather than U-shaped in cross-section. Also, different size clamping members may be used to fit the different size lugs which would be found on different size couplings. Different length clamping members may be used with the same upper pin and handle construction for a wide variety of lugs. By simply changing clamping members, to match different size coupling lugs, a pipe installer may commonly use the remaining parts of the fastener for couplings of different sizes.

This invention may be further developed within the scope of the following claims. Accordingly, it is desired that the foregoing description be read as being merely illustrative of an operative embodiment of this invention and not in a strictly limiting sense. Having fully described an operative embodiment of this invention,

I claim:

1. A handle-type, releasable fastener for use in place of a fastener bolt which is normally used in a pipe coupling having curved segments which are arranged end-to-end around a central axis to encircle the adjacent end portions of a pair of co-axially aligned pipes for clamping said pipe end portions within the coupling, and with the adjacent ends of the segments being fastened together, and including a means for fastening at least one pair of adjacent segment ends together comprising radially outwardly extending upper and lower bolt lugs formed upon each of the adjacent segment ends, with the lugs having aligned bolt receiving openings through which a conventional bolt may be inserted for securing the two adjacent lugs together, said fastener comprising:

a pin having an upper pin part and a lower pin part, respectively, arranged within the aligned bolt holes in said lugs in place of a normally used fastener bolt, with the upper pin part having a head formed thereon for engaging the hole in its respective upper lug, and a pivot formed on said head;

an elongated lever having an end pivotally connected to the head pivot;

a stiff clamp member attached to the lever near the pivotal connection between the lever and the head pivot and extending along the lugs and having a portion which carries the lower pin part for positioning the lower pin part within the bolt hole of its respective lower lug and which engages the exterior of the lower lug;

the lever being normally positioned adjacent an exterior surface of the upper lug segment, but being normally swingable about its pivotal connection with the head, away from such segment for releasing said clamp member engagement and to remove the lower pin part form the bolt hole in the lower lug, for thereby permitting manual movement of the upper pin part endwise out of the upper lug bolt hole to unfasten said adjacent segment ends for unclamping pipe end portions within the coupling and to permit inserting pipe ends within the coupling.

2. A releasable fastener as defined in claim 1 and said lever having a hook-like formation formed on its end at a location radially outwardly, of its pivotal connection to the head pivot, and said clamp member having a portion releasably engaged within said hook portion for interchanging clamp members of different sizes for utilizing the fastener to secure together different size segment lugs.

3. A releasable fastener as defined in claim 2 and including said clamp member having at least one stem part which extends along the lugs and which terminates in a lower part upon which the lower pin part is secured, with the stem part being of a length to swing the pin part out of and around the free end of the lower lug when the lever is swung into an unlocked position and to swing the pin part into the lower lug bolt hole when the lever is swung in an opposite position for locking the fastener in place.

4. A combined segment-type pipe coupling and releasable fastener for securing at least one adjacent pair of segment ends together comprising:

said coupling including curved segments which are arranged end-to-end around a central axis to form a circular coupling for surrounding adjacent end portions of a pair of co-axially aligned pipes for clamping said pipe ends within the coupling;

at least one adjacent pair of segment ends having radially, outwardly extending, integral, aligned bolt fastening lugs having bolt holes through which a conventional bolt may be arranged for securement therein by a conventional nut;

a releasable fastener for use in place of the conventional bolt and nut, including a pin, of generally the diameter of the bolt it replaces, with the pin having a first pin part arranged within the bolt hole in one of the lugs and a second pin part arranged within the bolt hole of the second lug;

a head formed on the first pin part and engaging the lug through which the first pin part extends;

a pivot formed on the head, with said pivot being pivotally connected to an end of a swingable lever normally arranged adjacent the surface of the segment whose lug is engaged by the pin head;

said lever having an end portion located radially outwardly of the pivot and terminating in a hook-like formation;

a clamp member having an end part engaged with the hook-like formation on the lever, and a side part extending along the aligned lugs and having an opposite end part upon which the second pin part is mounted, with the clamp member opposite end part extending around and engaging the adjacent portion of the second lug so that the clamp member locks the aligned bolt lugs together when the lever is swung into its position adjacent the surface of its segment and the clamp member is released from such engagement and the second pin part is retracted from its bolt hole when the lever is swung in an opposite direction away from its segment.

5. A releasable fastener as defined in claim 4, and including said clamp member end part being frictionally held upon the hook formation of the lever and being manually removable therefrom for substitution of a clamp member of a different size and shape to enable use of the fastener with different size and shape lugs of different segments.

6. A construction as defined in claim 4, and said clamp member side part being of sufficient length to swing around the second lug when the lever is in a release position for removing the second pin part from its bolt hole and to move the second pin part into its bolt hole in axial alignment with the first pin part when the lever is swung in the opposite, locking position, that is, arranged closely adjacent to the surface of its segment.

* * * * *